(12) United States Patent
Shiraishi et al.

(10) Patent No.: US 6,839,204 B2
(45) Date of Patent: Jan. 4, 2005

(54) HEAD GIMBAL ASSEMBLY WITH A GROUND OR SOURCE VOLTAGE LEAD CONDUCTOR

(75) Inventors: Masashi Shiraishi, Tokyo (JP); Takehiro Kamigama, Tokyo (JP)

(73) Assignee: TDK Corporation, Tokyo (JP)

(*) Notice: Subject to any disclaimer, the term of this patent is extended or adjusted under 35 U.S.C. 154(b) by 349 days.

(21) Appl. No.: 09/953,197

(22) Filed: Sep. 17, 2001

(65) Prior Publication Data

US 2002/0041469 A1 Apr. 11, 2002

(30) Foreign Application Priority Data

Sep. 19, 2000 (JP) ........................................ 2000-283285

(51) Int. Cl.[7] .............................................. G11B 5/48
(52) U.S. Cl. .................................................. 360/245.9
(58) Field of Search ...................................... 360/245.9

(56) References Cited

U.S. PATENT DOCUMENTS 5,754,369 A * 5/1998 Balakrishnan ............ 360/264.2
5,995,328 A * 11/1999 Balakrishnan ............ 360/245.9
6,515,832 B1 * 2/2003 Girard ....................... 360/245.3

* cited by examiner

Primary Examiner—George J. Letscher
(74) Attorney, Agent, or Firm—Burns, Doane, Swecker & Mathis, L.L.P.

(57) ABSTRACT

An HGA has a head slider including at least one write head element with terminal electrodes and at least one read head element with terminal electrodes, a suspension for supporting the head slider at a top end section thereof, and a lead conductor member including first trace conductors and second trace conductors. One ends of the first trace conductors are electrically connected to the terminal electrodes of the at least one write head element, and one ends of the second trace conductors are electrically connected to the terminal electrodes of the at least one read head element. At least part of the lead conductor member is fixed to the suspension. The lead conductor member further includes a ground (GND) or source voltage (Vcc) conductor inserted between the first and second trace conductors.

13 Claims, 3 Drawing Sheets

HEAD GIMBAL ASSEMBLY WITH A GROUND OR SOURCE VOLTAGE LEAD CONDUCTOR

FIELD OF THE INVENTION

The present invention relates to a head gimbal assembly (HGA) provided with a suspension for supporting a head slider having a write head element and a read head element used in a magnetic hard disk drive (HDD) unit or in an optical disk drive unit for example.

DESCRIPTION OF THE RELATED ART

In an HDD, magnetic write head elements for writing magnetic information onto magnetic hard disks and magnetic read head elements for reading magnetic information from the magnetic hard disks are in general formed on magnetic head sliders flying in operation above the rotating magnetic disks. The sliders are supported at top end sections of suspensions of HGAs, respectively.

In each HGA, one ends of two pairs of signal lines are electrically connected to a pair of terminal electrodes of the magnetic write head element and to a pair of terminal electrodes of the magnetic read head element formed on the magnetic head slider, respectively. These four signal lines run along the suspension and the other ends of these signal lines are electrically connected to external connection pads formed on the back end section or outside of the suspension, respectively.

Recently, a suspension using no lead wire for these signal lines or a lead conductor member, that is, a wireless suspension or a suspension using flexible print circuit (FPC) has widely spread.

The wireless suspension is configured by directly laminating a resin layer, a trace conductor layer and an overcoat layer on the suspension as for signal lines, or by fixing or laser-welding to a suspension a separated stainless steel thin plate on which a resin layer, a trace conductor layer and an overcoat layer are preliminarily formed.

The suspension with FPC is configured by adhering on a normal suspension a FPC fabricated by forming trace conductors on a resin base layer and by forming a resin overcoat layer on the resin base layer to cover the trace conductors.

In the wireless suspension or the suspension with FPC, two write signal lines electrically connected to two terminal electrodes of the write head element and also two read signal lines electrically connected to two terminal electrodes of the read head element are in general formed as four trace conductors that are adjacent to each other with keeping a small spacing and run in parallel along the suspension.

This intends to reduce the width of each trace conductor to lower the stiffness of the lead conductor member as much as possible so that influence on the suspension, especially on a load gram control section (bending section), is suppressed to the minimum extent, to reduce the total weight of the lead conductor member as much as possible, and to reduce the area of the expensive lead conductor member as much as possible to increase the number of the lead conductor members fabricated from a work sheet so as to lower the manufacturing cost.

The data write rate in recent HDDs tends to more increase and thus it is necessary to make the rising and falling edges of the write current steeper. However, if the rising and falling times of the write current are shortened, overshoot may occur at the rising or falling edge causing inductive electromotive force to produce on a trace conductor or a circuit adjacent to the write signal lines due to harmonic components of occurred on the write signal lines.

If the inductive electromotive force is produced on the read signal lines, the read head element, particularly a magnetoresistive effect (MR) read head element, connected thereto may deteriorate its reading characteristics. In the worst case, the MR read head element may be destroyed due to the inductive electromotive force.

SUMMARY OF THE INVENTION

It is therefore an object of the present invention to provide an HGA, whereby change in characteristics of a read head element and also destruction of the read head element can be prevented from occurring even if a write current with steep rising and falling edges is used to achieve a high data rate recording.

Another object of the present invention is to provide an HGA, whereby change in characteristics of a read head element and also destruction of the read head element can be prevented from occurring without substantially increasing the manufacturing cost.

According to the present invention, an HGA has a head slider including at least one write head element with terminal electrodes and at least one read head element with terminal electrodes, a suspension for supporting the head slider at a top end section thereof, and a lead conductor member including first trace conductors and second trace conductors. One ends of the first trace conductors are electrically connected to the terminal electrodes of the at least one write head element, and one ends of the second trace conductors are electrically connected to the terminal electrodes of the at least one read head element. At least part of the lead conductor member is fixed to the suspension. The lead conductor member further includes a ground (GND) or source voltage (Vcc) conductor inserted between the first and second trace conductors.

The GND or Vcc conductor is inserted between the first and second trace conductors. Since the GND or Vcc conductor acts as a shield pattern between the first and second trace conductors, no inductive electromotive force will be generated on the second trace conductors even if harmonic components occur on the first trace conductors due to overshoots produced at the rising and/or falling edges of the write current. Thus, change in characteristics of the read head element and also destruction of the read head element due to the inductive electromotive force can be prevented from occurring even if a write current with steep rising and falling edges is used to achieve a high data rate recording. Furthermore, since this can be achieved only by additionally forming one GND or Vcc conductor when fabricating the trace conductors, no additional process is necessary and therefore manufacturing cost will not substantially increase.

It is preferred that the GND or Vcc conductor is inserted between the first and second trace conductors along only at least one part of a length where the first and second trace conductors are close to each other, or along an entire length where the first and second trace conductors are close to each other.

It is also preferred that the lead conductor member is a FPC member consisting of a resin layer, the first and second trace conductors and the GND or Vcc conductor formed on the resin layer and an over coat layer for covering the first and second trace conductors and the GND or Vcc conductor.

It is further preferred that the lead conductor member consists of a resin layer directly laminated on the suspension, the first and second trace conductors and the GND or Vcc conductor formed on the resin layer and an over coat layer for covering the first and second trace conductors and the GND or Vcc conductor.

It is still further preferred that the lead conductor member consists of a resin layer laminated on a thin metal plate fixed to the suspension, the first and second trace conductors and the GND or Vcc conductor formed on the resin layer and an over coat layer for covering the first and second trace conductors and the GND or Vcc conductor.

It is preferred that the lead conductor member is formed only on the suspension, or on the suspension and extended toward the rear of the suspension.

It is also preferred that the suspension includes a base plate, a resilient hinge, a load beam coupled with the base plate via the hinge, and a resilient flexure fixed to a top end section of the load beam for mounting the head slider.

It is further preferred that the suspension includes a base plate, a load beam coupled with the base plate, and a resilient flexure fixed to a top end section of the load beam for mounting the head slider.

It is also preferred that the at least one write head element and the at least one read head element include at least one magnetic write head element and at least one magnetic read head element, respectively. In this case, preferably, the at least one magnetic read head element may be a magnetoresistive effect (MR) read head element.

Further objects and advantages of the present invention will be apparent from the following description of the preferred embodiments of the invention as illustrated in the accompanying drawings.

BRIEF DESCRIPTION OF THE DRAWINGS

FIG. 1b shows an oblique view illustrating a magnetic head slider in the embodiment shown in FIG. 1a;

FIG. 2 shows an enlarged view of a top end section of a suspension in the embodiment shown in FIG. 1a;

FIG. 3 shows an A—A line sectional view of FIG. 1a;

FIG. 4b shows an oblique view illustrating a magnetic head slider in the embodiment shown in FIG. 4a.

DESCRIPTION OF THE PREFERRED EMBODIMENTS

Figure 1A:
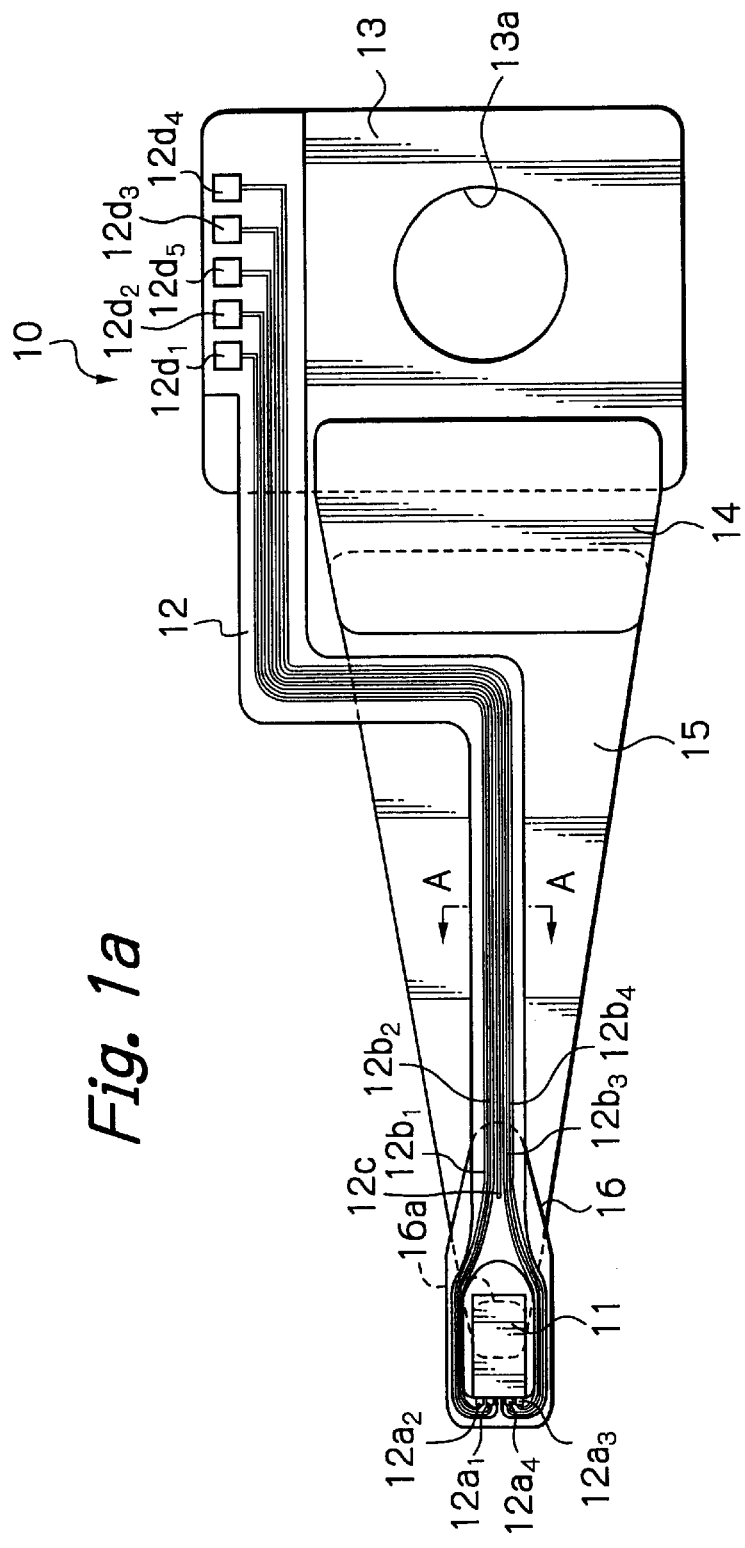
FIG. 1a shows a plane view illustrating the whole structure of an HGA seen from a slider-mounting surface in a preferred embodiment according to the present invention.
Figure 1B:
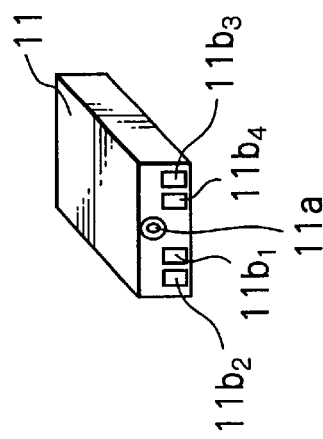
Figure 2:
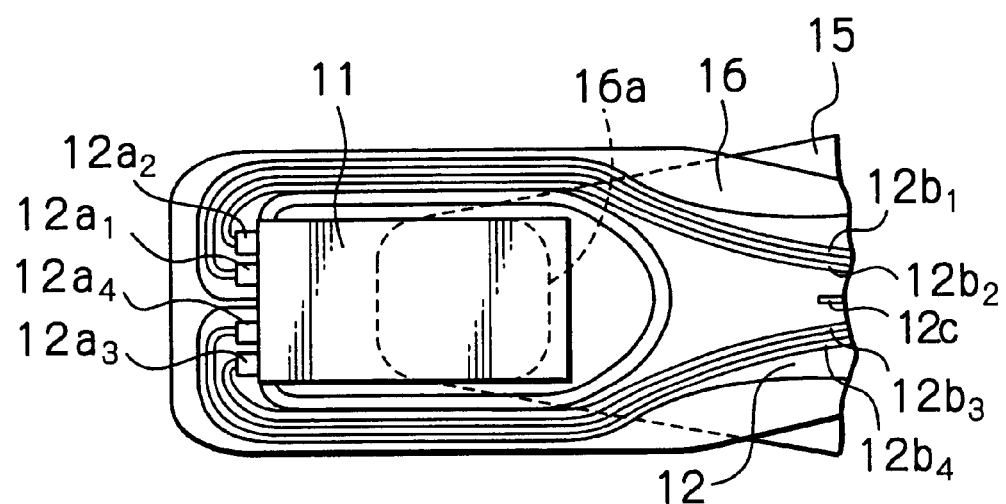
Figure 3:
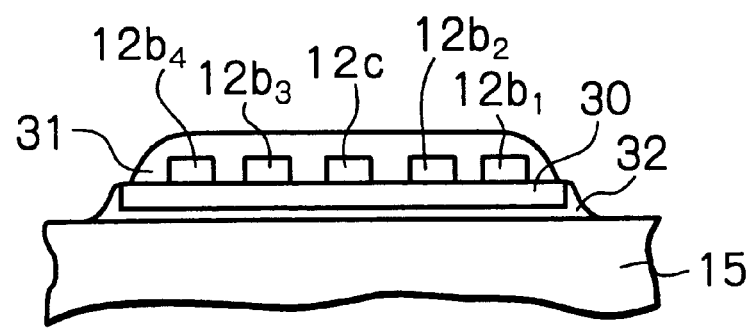

FIG. 1a illustrates the whole structure of an HGA seen from a slider-mounting surface in a preferred embodiment according to the present invention, FIG. 1b illustrates a magnetic head slider in this embodiment, FIG. 2 illustrates an enlarged view of a top end section of a suspension in this embodiment, and FIG. 3 illustrates an A—A line sectional view of FIG. 1a.

As shown in FIGS. 1a, 1b and 2, the HGA in this embodiment has a suspension 10, a magnetic head slider 11 provided with a thin-film write head element 11a and a thin-film MR read head element 11a, fixed to a top end section of the suspension 10 and a FPC or lead conductor member 12 adhered on the suspension 10. Four terminal electrodes $11b_1$ to $11b_4$ connected to the thin-film write head element and the thin-film read head element are electrically connected to four head connection pads $12a_1$ to $12a_4$ of the FPC 12 by ball bonding using for example Au balls or solder balls, respectively.

The suspension 10 is substantially formed by a base plate 13 with an attaching section 13a used to fix with a drive arm (not shown), a resilient hinge 14, a load beam 15 coupled with the base plate 13 via the hinge 14 and a resilient flexure 16 fixed to a top end section of the load beam 15 for mounting the magnetic head slider 11.

The base plate 13 is made of in this embodiment a stainless steel or iron plate and fixed to a one end section of the hinge 14 by welding. The HGA is attached to the drive arm by fixing the base plate 13 at its attaching section 13a.

The hinge 14 is made of in this embodiment a resilient stainless steel plate (for example SUS304TA) with a thickness of about 38 μm so as to have a small spring constant for easily adjusting the load (load gram).

The load beam 15 is fixed to the other end section of the hinge 14 by welding. This load beam 15 is shaped to have a width getting narrower toward its top end and is made of in this embodiment a relatively rigid stainless steel plate (for example SUS304TA) with a thickness of about 100 μm. Since the load beam 15 in this embodiment is thicker than the conventional load beam, deformation thereof can be effectively prevented. Side edges of the load beam 15 is not bent but flat so as to reduce its drag against side winds.

The flexure 16 has a flexible tongue 16a depressed by a dimple (not shown) formed on the load beam 15 and has elasticity for flexibly supporting by this tongue 16a the magnetic head slider 11 to provide a free attitude to the slider. The flexure 16 is made of in this embodiment a stainless steel plate (for example SUS304TA) with a thickness of about 20 μm.

The fixing of the base plate 13 with the hinge 14 and fixing of the hinge 14 with the load beam 15, and fixing of the load beam 15 with the flexure 16 are performed by pinpoint welding at a plurality of points.

A part of the FPC 12 is fixed on surfaces of the base plate 13, the load beam 15 and the flexure 16 by an adhesive. Between the base plate 13 and the load beam 15, this FPC 12 is partially floating in space.

The FPC 12 has two first trace conductors $12b_1$ and $12b_2$ as signal lines for the thin-film write head element, and two second trace conductors $12b_3$ and $12b_4$ as signal lines for the thin-film MR read head element. In a region from a midpoint of the flexure 16 to its top end section, the first trace conductors $12b_1$ and $12b_2$ and the second trace conductors $12b_3$ and $12b_4$ pass though the respective side regions of the slider 11. Then, at the top end section of the flexure 16, one ends of the first trace conductors $12b_1$ and $12b_2$ are electrically connected to the head connection pads $12a_1$ and $12a_2$ for the thin-film write head element respectively, and one ends of the second trace conductors $12b_3$ and $12b_4$ are electrically connected to the head connection pads $12a_3$ and $12a_4$ for the thin-film read head element respectively.

In a region from the midpoint of the flexure 16 to the rear section of the suspension 10, the first trace conductors $12b_1$ and $12b_2$ and the second trace conductors $12b_3$ and $12b_4$ run in parallel and have a smaller spacing there between. In the latter region, according to this embodiment, a ground (GND) or source voltage (Vcc) conductor 12c is inserted between the first trace conductors $12b_1$ and $12b_2$ and the second trace conductors $12b_3$ and $12b_4$ so that these first and second trace conductors are not directly adjacent to each other.

One end of the GND or Vcc conductor 12c is electrically opened. The other ends of the first trace conductors $12b_1$ and $12b_2$, the second trace conductors $12b_3$ and $12b_4$ and the GND or Vcc conductor $12c$ are electrically connected to respective external connection pads $12d_1$ to $12d_5$ formed on the FPC 12 at the side of the base plate 13. The external connection pad $12d_5$ electrically connected with the GND or Vcc conductor $12c$ is grounded or connected to a source voltage without exception so that the GND or Vcc conductor $12c$ is never in a floating state.

As shown in FIG. 3, the FPC 12 is fabricated by forming, on a thin resin layer or base film layer 30 made of a resin such as polyimide for example, patterns of the first trace conductors $12b_1$ and $12b_2$, the second trace conductors $12b_3$ and $12b_4$ and the GND or Vcc conductor $12c$ made of for example Cu, and then by covering these trace conductor patterns with an over coat layer 31 made of for example polyimide. The base film layer 30 of the FPC 12 is fixed to the load beam 15 by a UV resin or epoxy resin adhesive 32 for example.

Within a region of the FPC 12 adhered to the top end section of the flexure 16, the FPC 12 consists of only the base film layer 30 and the Cu patterns of the first trace conductors $12b_1$ and $12b_2$ and the second trace conductors $12b_3$ and $12b_4$ with an Au layer coated on the trace conductor patterns for preventing from corrosion. No over coat layer exists in this region. The base film layer 30 of the FPC 12 is fixed to the flexure 16 by a UV resin or epoxy resin adhesive 32 for example. Since no over coat layer is formed in this region of the FPC 12, which will have large effect on the spring constant, a lower stiffness of the HGA can be expected.

As aforementioned, according to this embodiment, since the GND or Vcc conductor $12c$ acts as a shield pattern between the first trace conductors $12b_1$ and $12b_2$ and the second trace conductors $12b_3$ and $12b_4$, no inductive electromotive force will be generated on the second trace conductors $12b_3$ and $12b_4$ even if harmonic components occur on the first trace conductors $12b_1$ and $12b_2$ due to overshoots produced at the rising and/or falling edges of the write current. Thus, change in characteristics of the read head element and also destruction of the read head element due to the inductive electromotive force can be prevented from occurring even if a write current with steep rising and falling edges is used to achieve a high data rate recording. Furthermore, since this can be achieved only by additionally forming one GND or Vcc conductor $12c$ when fabricating the trace conductors, no additional process is necessary and therefore manufacturing cost will not substantially increase.

Figure 4A:
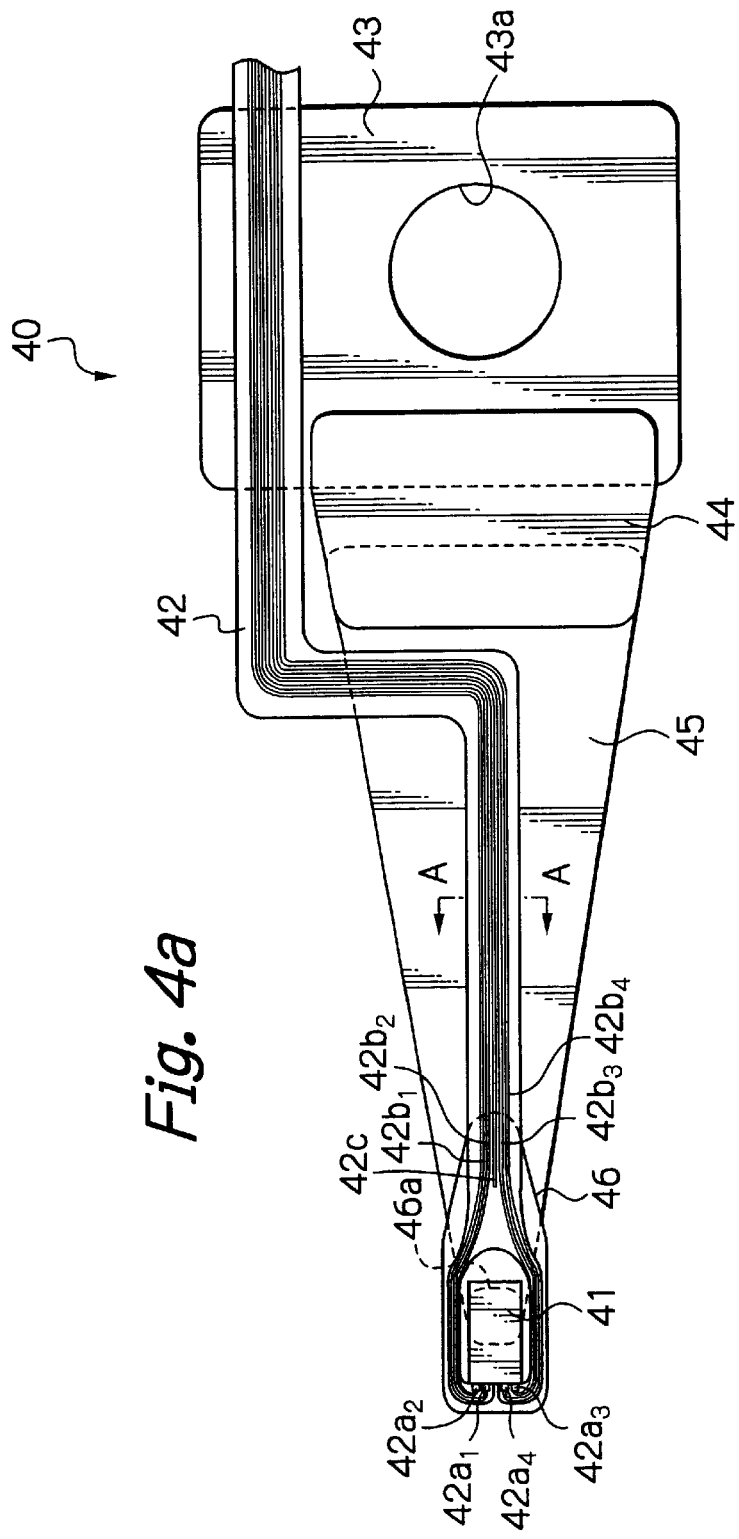
FIG. 4a shows a plane view illustrating the whole structure of an HGA seen from a slider-mounting surface in another embodiment according to the present invention.
Figure 4B:
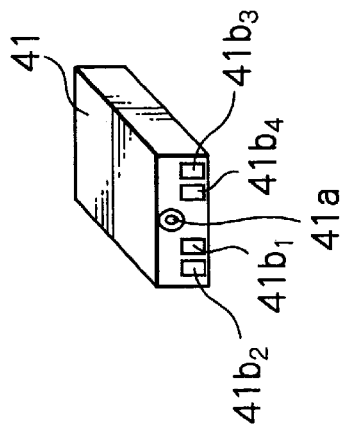

FIG. 4a illustrates the whole structure of an HGA seen from a slider-mounting surface in another embodiment according to the present invention, and FIG. 4b illustrates a magnetic head slider in the embodiment shown in FIG. 4a.

In this embodiment, a FPC 42 or lead conductor member has a long-tail structure extending toward the rear of a base plate 43.

As shown in FIGS. 4a and 4b, the HGA in this embodiment has a suspension 40, a magnetic head slider 41 provided with a thin-film write head element 41a and a thin-film MR read head element 41a, fixed to a top end section of the suspension 40, and the FPC or lead conductor member 42 adhered on the suspension 40. Four terminal electrodes $41b_1$ to $41b_4$ connected to the thin-film write head element and the thin-film read head element are electrically connected to four head connection pads $42a_1$ to $42a_4$ of the FPC 42 by ball bonding using for example Au balls or solder balls, respectively.

The suspension 40 is substantially formed by the base plate 43 with an attaching section 43a used to fix with a drive arm (not shown), a resilient hinge 44, a load beam 45 coupled with the base plate 43 via the hinge 44 and a resilient flexure 46 fixed to a top end section of the load beam 45 for mounting the magnetic head slider 41.

The base plate 43 is made of in this embodiment a stainless steel or iron plate and fixed to a one end section of the hinge 44 by welding. The HGA is attached to the drive arm by fixing the base plate 43 at its attaching section 43a.

The hinge 44 is made of in this embodiment a resilient stainless steel plate (for example SUS304TA) with a thickness of about 38 μm so as to have a small spring constant for easily adjusting the load (load gram).

The load beam 45 is fixed to the other end section of the hinge 44 by welding. This load beam 45 is shaped to have a width getting narrower toward its top end and is made of in this embodiment a relatively rigid stainless steel plate (for example SUS304TA) with a thickness of about 100 μm. Since the load beam 45 in this embodiment is thicker than the conventional load beam, deformation thereof can be effectively prevented. Side edges of the load beam 45 is not bent but flat so as to reduce its drag against side winds.

The flexure 46 has a flexible tongue 46a depressed by a dimple (not shown) formed on the load beam 45 and has elasticity for flexibly supporting by this tongue 46a the magnetic head slider 41 to provide a free attitude to the slider. The flexure 46 is made of in this embodiment a stainless steel plate (for example SUS304TA) with a thickness of about 20 μm.

The fixing of the base plate 43 with the hinge 44 and fixing of the hinge 44 with the load beam 45, and fixing of the load beam 45 with the flexure 46 are performed by pinpoint welding at a plurality of points.

A part of the FPC 42 is fixed on surfaces of the base plate 43, the load beam 45 and the flexure 46 by an adhesive. Between the base plate 43 and the load beam 45, this FPC 42 is partially floating in space.

The FPC 42 has two first trace conductors $42b_1$ and $42b_2$ as signal lines for the thin-film write head element, and two second trace conductors $42b_3$ and $42b_4$ as signal lines for the thin-film MR read head element. In a region from a midpoint of the flexure 46 to its top end section, the first trace conductors $42b_1$ and $42b_2$ and the second trace conductors $42b_3$ and $42b_4$ pass through the respective side regions of the slider 41. Then, at the tope end section of the flexure 46, one ends of the first trace conductors $42b_1$ and $42b_2$ are electrically connected to the head connection pads $42a_1$ and $42a_2$ for the thin-film write head element respectively, and one ends of the second trace conductors $42b_3$ and $42b_4$ are electrically connected to the head connection pads $42a_3$ and $42a_4$ for the thin-film read head element respectively.

In a region from the midpoint of the flexure 46 to the rear section of the suspension 40, the first trace conductors $42b_1$ and $42b_2$ and the second trace conductors $42b_3$ and $42b_4$ run in parallel and have a smaller spacing there between. In the latter region, a ground (GND) or source voltage (Vcc) conductor $42c$ is inserted between the first trace conductors $42b_1$ and $42b_2$ and the second trace conductors $42b_3$ and $42b_4$ so that these first and second trace conductors are not directly adjacent to each other.

One end of the GND or Vcc conductor $42c$ is electrically opened. The other ends of the first trace conductors $42b_1$ and $42b_2$, the second trace conductors $42b_3$ and $42b_4$ and the GND or Vcc conductor $42c$ are electrically connected to external connection pads formed on not shown rear end section of the FPC 42, extending toward the rear of the base plate 43. The external connection pad electrically connected with the GND or Vcc conductor 42c is grounded or connected to a source voltage without exception so that the GND or Vcc conductor 42c is never in a floating state.

A laminating structure of the FPC 42 is the same as that of the FPC 12 shown in FIG. 3. Also, another configurations and advantages of this embodiment are that same as those of the embodiment shown in FIGS. 1a, 1b, 2 and 3.

In the aforementioned two embodiments, the GND or Vcc conductor is inserted between the first and second trace conductors along an entire length where these first and second trace conductors are close to each other and run in parallel. However, it is effective that the GND or Vcc conductor is inserted only a part or parts of the length, where the spacing between the first and second trace conductors is extremely narrow.

Further, it is apparent that the suspension according to the present invention is not limited to the four piece structure with a base plate, a hinge, a load beam and a flexure (five piece structure if a FPC is counted), but may be a three piece structure with a base plate, a load beam and a flexure (four piece structure if a FPC is counted), or a two piece structure with a base plate and a flexure-load beam (three piece structure if a FPC is counted).

The aforementioned embodiments use a suspension with a FPC. However, a wireless suspension with a resin layer directly formed on the suspension, first and second trace conductors and a GND or Vcc conductor formed on the resin layer and an overcoat layer for covering the first and second trace conductors and the GND or Vcc conductor, or a wireless suspension with a thin metal plate on which a resin layer, first and second trace conductors and a GND or Vcc conductor formed on the resin layer and an overcoat layer for covering the first and second trace conductors and the GND or Vcc conductor are preliminarily formed can be used in the present invention. Since the basic structure of these suspensions is well-known in this field, descriptions and drawings of them are omitted.

In case that a GND or Vcc conductor is additionally inserted between the two second trace conductors connected to the read head element, common-mode noise will be suppressed.

In the aforementioned embodiments also, an HGA for a magnetic head slider with thin-film magnetic head elements is described. However, it is apparent that the present invention can be applied to an HGA for a head element such as an optical head element other than the HGA with the thin-film magnetic head element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head gimbal assembly comprising:
a head slider including at least one write head element with terminal electrodes and at least one read head element with terminal electrodes;
a suspension for supporting said head slider at a top end section thereof; and
a lead conductor member including first trace conductors and second trace conductors, one ends of said first trace conductors being electrically connected to the terminal electrodes of said at least one write head element, one ends of said second trace conductors being electrically connected to the terminal electrodes of said at least one read head element, at least part of said lead conductor member being fixed to said suspension, said lead conductor member further including a ground or source voltage conductor inserted between said first and second trace conductors, wherein said first and second trace conductors are not directly adjacent to each other.

2. The head gimbal assembly as claimed in claim 1, wherein said ground or source voltage conductor is inserted between said first and second trace conductors along only a part of a length where said first and second trace conductors are close to each other.

3. The head gimbal assembly as claimed in claim 1, wherein said ground or source voltage conductor is inserted between said first and second trace conductors along an entire length where said first and second trace conductors are close to each other.

4. The head gimbal assembly as claimed in claim 1, wherein said lead conductor member is a FPC member consisting of a resin layer, said first and second trace conductors and said ground or source voltage conductor formed on said resin layer and an over coat layer for covering said first and second trace conductors and said ground or source voltage conductor.

5. The head gimbal assembly as claimed in claim 1, wherein said lead conductor member consists of a resin layer directly laminated on said suspension, said first and second trace conductors and said ground or source voltage conductor formed on said resin layer and an over coat layer for covering said first and second trace conductors and said ground or source voltage conductor.

6. The head gimbal assembly as claimed in claim 1, wherein said lead conductor member consists of a resin layer laminated on a thin metal plate fixed to said suspension, said first and second trace conductors and said ground or source voltage conductor formed on said resin layer and an over coat layer for covering said first and second trace conductors and said ground or source voltage conductor.

7. The head gimbal assembly as claimed in claim 1, wherein said lead conductor member is formed only on said suspension.

8. The head gimbal assembly as claimed in claim 1, wherein said lead conductor member is formed on said suspension and extended toward the rear of said suspension.

9. The head gimbal assembly as claimed in claim 1, wherein said suspension includes a base plate, a resilient hinge, a load beam coupled with said base plate via said hinge, and a resilient flexure fixed to a top end section of said load beam for mounting said head slider.

10. The head gimbal assembly as claimed in claim 1, wherein said suspension includes a base plate, a load beam coupled with said base plate, and a resilient flexure fixed to a top end section of said load beam for mounting said head slider.

11. The head gimbal assembly as claimed in claim 1, wherein said at least one write head element and said at least one read head element comprise at least one magnetic write head element and at least one magnetic read head element, respectively.

12. The head gimbal assembly as claimed in claim 11, wherein said at least one magnetic read head element comprises a magnetoresistive effect read head element.

13. The head gimbal assembly as claimed in claim 1, wherein said ground or source voltage conductor is connected to a ground or source voltage.

* * * * *